(12) United States Patent
Koli et al.

(10) Patent No.: US 11,722,160 B2
(45) Date of Patent: Aug. 8, 2023

(54) RADIO FREQUENCY RECEIVER FOR CARRIER AGGREGATION

(71) Applicant: Huawei Technologies Co., Ltd., Shenzhen (CN)

(72) Inventors: Kimmo Koli, Helsinki (FI); Mikko John Englund, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/349,024

(22) Filed: Jun. 16, 2021

(65) Prior Publication Data

US 2021/0376868 A1 Dec. 2, 2021

Related U.S. Application Data

(63) Continuation of application No. PCT/EP2018/085310, filed on Dec. 17, 2018.

(51) Int. Cl.
*H04B 1/10* (2006.01)
*H03F 3/24* (2006.01)
(Continued)

(52) U.S. Cl.
CPC ......... *H04B 1/0082* (2013.01); *H04B 1/0035* (2013.01); *H04B 1/16* (2013.01)

(58) Field of Classification Search
CPC .... H03D 7/1458; H03D 7/165; H03D 7/1441; H03D 7/1466; H03D 7/1483; H03D 2200/0086; H03D 2200/0084; H03D 2200/0088; H03D 7/166; H03D 7/12; H03D 7/1491; H03D 7/18; H03D 1/04; H03D 7/00; H03D 2200/0047; H03D 2200/0074; H03D 3/007; H03D 7/125; H03D 7/14;
(Continued)

(56) References Cited

U.S. PATENT DOCUMENTS 7,436,910 B2 * 10/2008 Fudge ................ H04B 1/71637
375/340
2004/0116096 A1 6/2004 Shen
(Continued)

FOREIGN PATENT DOCUMENTS

CN 103947149 A 7/2014
CN 106330212 A 1/2017
(Continued)

OTHER PUBLICATIONS

Baumgratz, F., et al., "40-nm CMOS Wideband High-IF Receiver Using a Modified harge-Sharing Bandpass Filter to Boost Q-Factor", IEEE Transactions on Circuits and Systems-I: Regular Papers, col. 65, No. 8, Aug. 2018, 11 Pages.
(Continued)

*Primary Examiner* — Golam Sorowar
(74) *Attorney, Agent, or Firm* — Slater Matsil, LLP

(57) ABSTRACT

A Radio Frequency (RF) receiver is provided. The RF receiver is configured to simultaneously receive at least two radio frequency bands with a single receiver path. The RF receiver comprises a single local oscillator (LO), and the RF receiver is configured to filter a received signal using a complex filter having a variable center frequency. In accordance with another aspect, many RF receivers are combined to form an aggregate carrier receiver.

18 Claims, 10 Drawing Sheets

(51) Int. Cl.
  *H03H 7/01*    (2006.01)
  *H04M 1/02*    (2006.01)
  *H04B 1/00*    (2006.01)
  *H04B 1/16*    (2006.01)

(58) Field of Classification Search
  CPC .... H03D 7/1433; H03D 7/163; H03D 7/1475;
         H03D 2200/0041; H04B 1/30; H04B
         1/16; H04B 1/10; H04B 1/0014; H04B
         1/109; H04B 1/28; H04B 1/123; H04B
         1/525; H04B 15/06; H04B 1/0028; H04B
         1/0475; H04B 1/1027; H04B 1/26; H04B
         1/006; H04B 1/1018; H04B 1/1036;
         H04B 1/0057; H04B 1/1638; H04B 1/40;
         H04B 1/0082; H04B 1/12; H03F
         2200/294; H03F 3/45475; H03F
         2200/451; H03F 3/193; H03F
         2203/45526; H03F 3/211; H03F 1/26;
         H03F 1/3205; H03F 2200/165; H03F
         3/195; H03F 2203/45051; H03F
         2203/45731; H03F 3/45179; H03F
         3/45188; H03F 3/45636; H03F 3/45941;
         H03F 1/02; H03F 1/0205; H03F 1/0277;
         H03F 1/223; H03F 1/30; H03F 1/3211;
         H03F 1/565; H03F 2200/111; H03F
         2200/168; H03F 2200/171
  See application file for complete search history.

(56) References Cited

U.S. PATENT DOCUMENTS

| 2006/0205370 | A1  | 9/2006  | Hayashi et al. |
| 2012/0026407 | A1  | 2/2012  | Zhang et al. |
| 2012/0214524 | A1* | 8/2012  | Wajcer ................ H04B 7/0845 455/502 |
| 2013/0130637 | A1  | 5/2013  | Kaukovuori et al. |
| 2014/0369452 | A1* | 12/2014 | Dubash ................ G01S 19/33 375/350 |
| 2015/0028944 | A1  | 1/2015  | Alzaher |
| 2015/0180523 | A1* | 6/2015  | Tasic ................ H03H 7/0161 375/316 |
| 2015/0214926 | A1* | 7/2015  | Tohidian ................ H03D 7/125 333/173 |
| 2017/0061188 | A1* | 3/2017  | Kremin ................ G06F 3/0446 |
| 2017/0214391 | A1* | 7/2017  | Hedayati ............... H03H 19/002 |
| 2019/0020310 | A1* | 1/2019  | Modi .................... H03D 7/165 |

FOREIGN PATENT DOCUMENTS

| CN | 107949987 A   | 4/2018 |
| WO | 2017041814 A1 | 3/2017 |
| WO | 2019197040 A1 | 10/2019 |

OTHER PUBLICATIONS

Chen, R., et al., "Reconfigureable Receiver with Radio-Frequency Current-Mode Complex Signal Processing Supporting Carrier Aggregation", IEEE Journal of Solid-State Circuits, col. 50, No. 12, Dec. 2015, 15 Pages.

Martin, K., "Complex Signal Processing is Not Complex", IEEE Transactions on Circuits and Systems-I: Regular Papers, vol. 51, No. 9, Sep. 2004, 14 Pages.

Sundström, L., et al., "Complex IF Harmonic Rejection Mixer for Non-Contiguous Dual Carrier Reception in 65 nm CMOS", IEEE Journal of Solid-State Circuits, col. 48, No. 7, Jul. 7, 2013, 10 Pages.

* cited by examiner

RADIO FREQUENCY RECEIVER FOR CARRIER AGGREGATION

CROSS-REFERENCE TO RELATED APPLICATIONS

This application is a continuation of International Application No. PCT/EP2018/085310, filed on Dec. 17, 2018, the disclosure of which is hereby incorporated by reference in its entirety.

TECHNICAL FIELD

The application relates to a radio frequency receiver and in particular to a radio frequency receiver suitable for aggregation of carriers.

BACKGROUND

Today's radio frequency (RF) receivers for the 4G telecommunication standard and also future 5G telecommunication standard receivers use extensive amount of so-called carrier aggregation. Carrier aggregation provides for transmission of data over multiple carriers simultaneously. Carrier aggregation is typically employed when there are not enough continuous frequency bands available to meet the bandwidth requirements for very high data rates. The expanded use of carrier aggregation will require increasing amounts of parallel receivers, front-end modules, and antennas. There are physical limits for adding more antennas to mobile devices and front-end module cost will also restrict the amount for parallel receiver chains.

In order to meet the increasing number of inter-band non-contiguous earlier aggregation cases, the RF integrated Circuit (IC) should preferably receive simultaneously more than one frequency band with a single receiver path if the receiver bandwidth and dynamic range is large enough. However, reaching high dynamic range simultaneously with wide bandwidth requires both a high current consumption and a large silicon area. Therefore, it is typically more feasible to provide a receiver circuit with several connected parallel receiver paths to one RF input port in the RF IC that only share an RF input buffer stage.

When two separate receivers are receiving frequency bands close to each other, the generated Local Oscillator (LO)-frequencies of the two down-conversion mixers are also close to each other. This makes the two voltage-controlled oscillators (VCOs), or digitally controlled oscillators (DCOs), to disturb each other. Alternative one of the oscillators is forced to operate at double or even higher frequency thus complicating frequency synthesizer and LO-divider implementation.

As an alternative, the two receiver paths could share the same LO-frequency (and naturally only one frequency synthesizer) that is haft-way between the two desired frequency bands using low-IF architecture as depicted in FIG. 5. In order to maximize the receiver selectivity and relax the dynamic range requirements, the analog baseband filter is implemented as a complex filter i.e. a bandpass filter having its center frequency either on positive or negative frequency. Such an implementation is described in K. W. Martin, "Complex signal processing is not complex," in IEEE Transactions on Circuits and Systems I: Regular Papers, vol. 51, no. 9, pp. 1823-1836, September 2004.

Complex filters can be implemented from low-pass filters by cross feeding filter integrator feedback signals between I- and Q-branches. Then a direct conversion receiver (i.e. zero-intermediate frequency IF) can be transformed into a complex filter having a center frequency either on a positive intermediate frequency $+f_{IF}$ or a negative intermediate frequency $-f_{IF}$. The analog-digital converters in low-IF receivers are usually implemented as complex $\Delta\Sigma$ Analogue to Digital conversions (ADCs) so that the down-conversion from IF frequency to DC is implemented in digital domain.

The low-IF architecture with complex baseband filter works energy effectively for IF frequencies in the range of few tens of megahertz. With higher IF frequencies it becomes increasingly difficult to implement the complex frequency response without strongly increasing variation in the frequency response over process, supply voltage and temperature. Similarly, because of the diminishing oversampling ratio, the complex $\Delta\Sigma$ Analogue to Digital conversions (ADCs) becomes finally impossible to implement.

In order to cover a higher IF frequency range with the same receiver, the IF down-conversion should be shifted from digital to analogue domain in front of the ADC as depicted in FIG. 6. In FIG. 6 multiple (here two) receivers together implement a carrier aggregation receiver. However, the digital IF down-conversion typically is much less non-ideal than the analog counterpart. There is no I-Q mismatch added by the digital mixing function and the mixing from LO harmonics can be prevented by adding digital filtering before the downmixing. When IF down-conversion is performed before the ADC, the filtering requirements of the complex analog baseband filter are tightened to prevent mixing from LO harmonics or alternatively a harmonic reject mixer can be used.

Hence, there is a need for an improved RF receiver and in particular an improved RF receiver that can provide carrier aggregation reception.

SUMMARY

It is an object of the present application to provide an improved an improved RF receiver and also to provide an improved carrier aggregation receiver.

These objects and or other objects are obtained by the RF receiver and the carrier aggregation receiver as set out in the appended claims.

In accordance with a first aspect of the application, Radio Frequency (RF) receiver is provided. The RF receiver is configured to simultaneously receive at least two radio frequency bands with a single receiver path. The RF receiver comprises a single local oscillator (LO) and the RF receiver is configured to filter a received signal using a complex filter having a variable center frequency, Hereby an efficient RF receiver for receiving multiple carriers can be implemented.

In accordance with a first implementation of the first aspect, the center frequency of the complex filter is a programmable center frequency. Hereby the center frequency can easily be adapted to different center frequencies.

In accordance with a second implementation of the first aspect, the center frequency of the complex filter is a center frequency equal to an intermediate frequency (IF) of the RF receiver. Hereby the receiver can efficiently filter relevant frequencies.

In accordance with a third implementation of the first aspect, the center frequency is either a positive or a negative intermediate frequency (if) of the RF receiver. Hereby both positive and negative intermediate frequencies can be filtered.

In accordance with a fourth implementation of the first aspect, the complex filter comprises a grounded RC-circuit connected to a voltage buffer and the complex filter further comprises an offset capacitor configured to offset the center frequency of the RC-circuit. Hereby an efficient implementation of the complex filter can be Obtained.

In accordance with a fifth implementation of the first aspect, the RF receiver is configured to perform intermediate frequency (IF) down-conversion using a Finite Impulse Response (FIR) mixer. Hereby the receiver can be efficiently implemented with a downconverter having good harmonic rejection capabilities.

In accordance with a sixth implementation of the first aspect, the FIR mixer comprises at least two delayed paths. In particular the FIR mixer can comprise 2-4 delayed paths. Hereby the harmonic rejection can be improved.

In accordance with a sixth implementation of the first aspect, the FIR mixer is configured to weigh signals on paths of the FIR mixer. Hereby a more efficient receiver with better harmonic rejection can be implemented.

In accordance with a second aspect of the application, carrier aggregation receiver comprising at least two RF receivers according to the above is provided Hereby an efficient receiver structure that can receive many aggregated carriers can be obtained.

In accordance with a first implementation of the second aspect, the at least two RF receivers are configured to operate with different signs of the intermediate frequency. IF, frequency. Hereby both positive and negative IF frequencies can be filtered using the same receiver structure.

In accordance with a second implementation of the second aspect, the at least two RF receivers are configured to operate with different IF frequencies. Hereby different IF frequencies can be filtered in the same receiver structure.

In accordance with a third implementation of the second aspect, each of said at least two RF receivers is configured to operate using the same LO. Hereby an efficient receiver implementation can be achieved that is easy to synchronize.

In accordance with a fourth implementation of the second aspect, the carrier aggregation receiver is configured to perform Analogue to Digital conversion (ADC) for each of said at least two RF receivers using the same ADC clock. Hereby an efficient receiver implementation can be achieved that is easy to synchronize.

In accordance with a fourth implementation of the second aspect, the FIR mixers for each of said at least two RF receiver are configured to use the same ADC clock. Hereby an efficient receiver implementation can be achieved that is easy to synchronize.

BRIEF DESCRIPTION OF THE DRAWINGS

The application will now be described in more detail, by way of example, and with reference to the accompanying drawings, in which.

DETAILED DESCRIPTION OF ILLUSTRATIVE EMBODIMENTS

The application will now be described in detail hereinafter with reference to the accompanying drawings, in which certain embodiments of the application are shown. The application may, however, be embodied in many different forms and should not be construed as limited to the embodiments set forth herein; rather, these embodiments are provided by way of example so that this disclosure will be thorough and complete, and will fully convey the scope of the application to those skilled in the art. Like numbers refer to like elements throughout the description.

To improve the filtering of for example harmonics of a Local Oscillator (LO) signal, an electrical circuit implementing a so-called FIR-mixer can be used. A FIR-mixer is described in co-pending patent application no. PCT/EP2018/059561. The electrical circuit forming the FIR-mixer can be formed by a FIR filter configured to filter the LO signal itself. This is implemented using parallel mixers added with delayed version(s) of the original LO, effectively creating a Finite Impulse Response (FIR) filter for the LO waveform. The mixers can be weighted to obtain various filter responses, and the electrical circuit as described herein can have various applications in addition to the harmonic rejection example used herein. The FIR-mixer is described below with reference to FIGS. 1-4.

Figure 1:
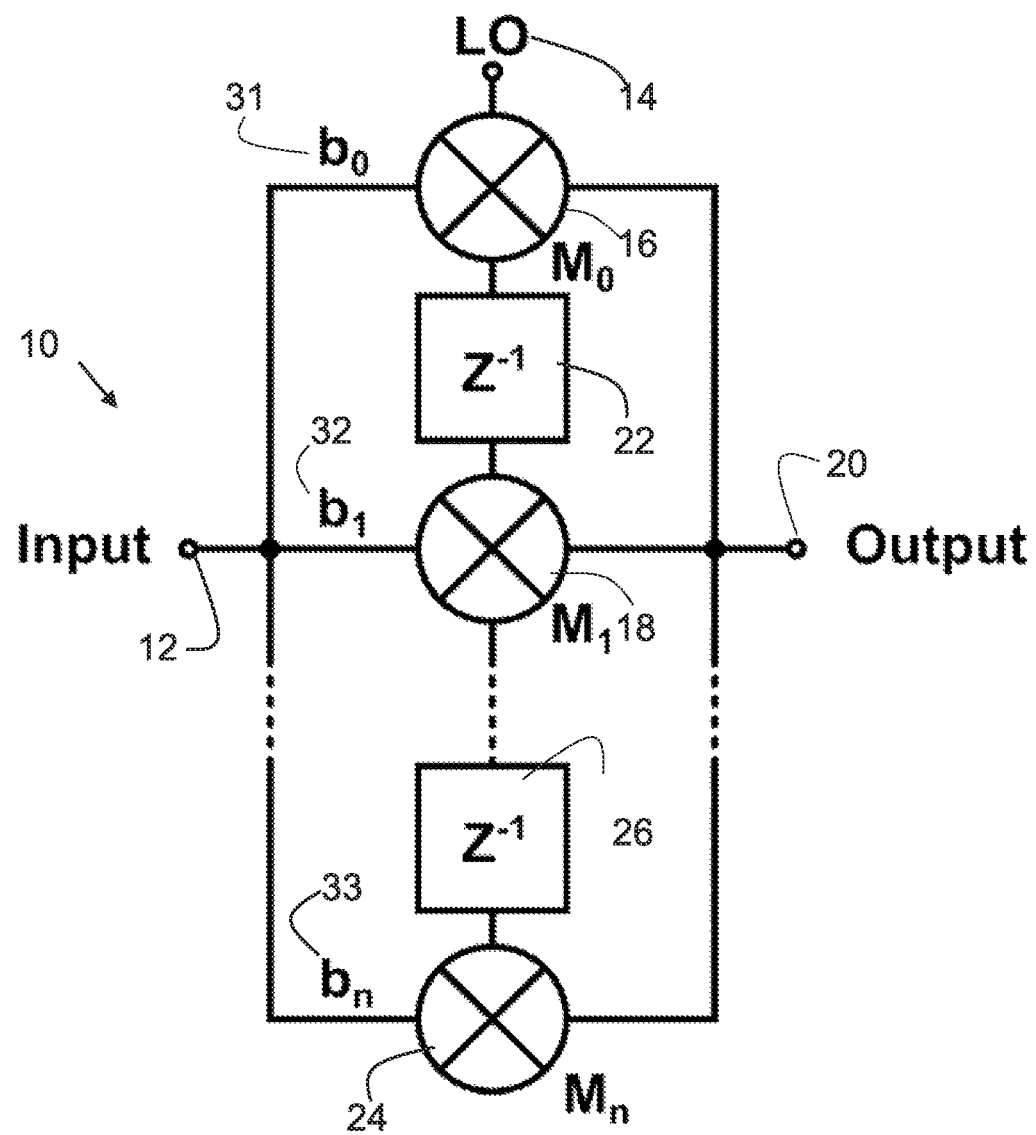
FIG. 1 shows an electrical circuit that can filter a local oscillator signal.

In FIG. 1 an electrical circuit to that can implement a FIR filtering of a LO signal is shown. The electrical circuit comprises an input terminal 12. The input terminal 12 can be configured to receive a signal to be mixed with a Local Oscillator, LO, signal. The mixing of the input signal at the input terminal 12 and the local oscillator signal is performed in a first mixer 16. To simplify the description the generation of the LO signal is represented by a Local Oscillator, LO, 14. However, how the LO signal is generated is not important and any device generating a LO signal can be used, including but not limited to an oscillator. The term Local Oscillator whenever used herein should therefore be interpreted in a broad sense as any device capable of generating an LO signal. The first mixer 16 is connected to the input terminal 12 and to the local oscillator 14. The output from the first mixer 16 is connected to an output terminal 20, In order to filter, for example, harmonic components in the generated oscillator signal, the signal at the output terminal can be combined with a delayed version of the oscillator signal mixed with the input signal. This can be obtained by feeding the LO signal via a delay element 22 to a second mixer 18. The second mixer 18 is configured to mix the delayed version of the LO signal with the input signal. Thus, the second mixer 18 is connected to the input terminal and to the output from the delay element 22. The electrical circuit can in accordance with some embodiments have additional mixers 24 configured to mix the input signal with further delayed versions of the oscillator signal. The signal formed by the additional mixers 24 can be combined with the other output signals from the first mixer and the second mixer at the output terminal. The delayed version(s) of the oscillator signal can be generated by a single delay element 22 or additional delay elements 26 can be provided in the electrical circuit 10.

The structure of the electrical circuit 10 implementing a FIR-mixer, can be seen as a FIR filter for the oscillator signal where the delayed version(s) of the local oscillator signal is/are mixed with the input signal to form an output signal.

The delayed versions of the LO signal can be mixed with weighted versions of the input signal. For this purpose, weights can be provided at the respective paths between the input terminal and the different mixers. For example, in the embodiment shown in FIG. 1 weights 31, 32, and 33 are provided before the mixers 16, 18, and 24. The weights for weighting the input signal can be provided before the mixer as shown in FIG. 1. In another embodiment the weights can be provided after the mixers before combining the signals at the output terminal. Hereby, a finite impulse response (FIR) filter for filtering a local oscillator signal is provided where the FIR filter is configured to receive the local oscillator signal to be filtered, and wherein weights of the FIR filter are based on weighted versions of an input signal. The weights can for example be implemented using resistors. The value of the resistors can be configurable to allow adjustment of the filter weights to suit a particular application.

In such a FIR filter configuration, the filter can be configured to weigh an un-delayed version of the local oscillator signal with a first weighted version of the input signal and a first delayed version of the local oscillator signal with a second weighted version of the input signal. For example, in the embodiment of FIG. 1 the first weighted version is weighted by a weight 31 having a weight $b_0$ and the second weighted version is weighted by a weight 32 having a weight $b_1$. In a configuration with three mixers using three delayed versions of the local oscillator signal, three different weights can be provided. The relative weights for the three different weights can then be $b_0=1, b_1=\sqrt{2}, b_2=1$ Such a selection of weights 31, 32, and 33 can advantageously be used to filter out at east the 3rd and 5th harmonics of the local oscillator signal.

As is implied by FIG. 1, additional mixer cores are added in parallel of the first mixer 16 and the second mixer 18. The number of mixers and delayed versions of the oscillator signal mixed with the input signal by the respective mixer can depend upon the application. Each mixer input. (or output or both input and output) is weighted with corresponding coefficient bx. The additional mixers are driven with increasingly delayed version of the original local oscillator signal. In one embodiment, the LO signal is delayed by one sampling clock cycle t_s. The sampling clock cycle is the LO clock cycle t_LO divided by an integer number such as 8, which is used in the following as an example.

Figure 2:
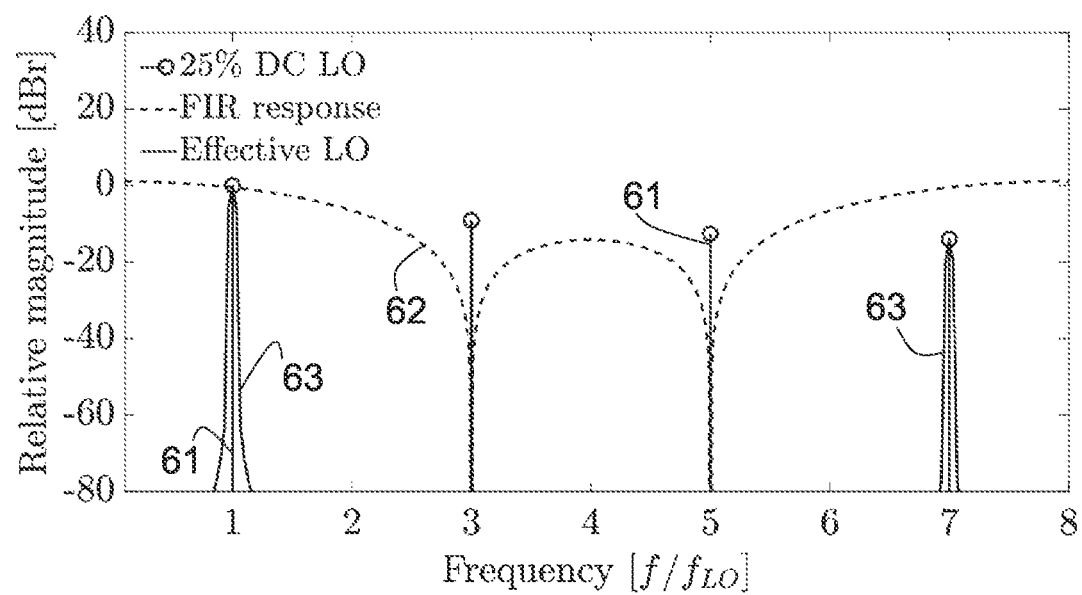
FIG. 2 illustrates spectra of the original LO, the effective LO, and the FIR filter response.

In order to obtain harmonic rejection for the 3rd and 5th harmonics, three mixers can be used for FIG. 1 that would mean a first mixer 16 and two additional mixer cores 18 and 24. If the relative weighting of coefficients is selected as above, i.e., $b_0=1, b_1=\sqrt{2}, b_2=1$ a filtering response 62 shown in FIG. 2 is applied to the LO signal. In FIG. 2, the original LO signal is a 25% duty-cycle (DC) pulse wave 61, which contains odd harmonics in addition to the desired fundamental tone. In the filtered LO signal 63, the 3rd and the 5th harmonic of the LO signal are cancelled. In a practical application, the attenuation is limited by how accurately the coefficients can be implemented.

Figures 3A, 3B:
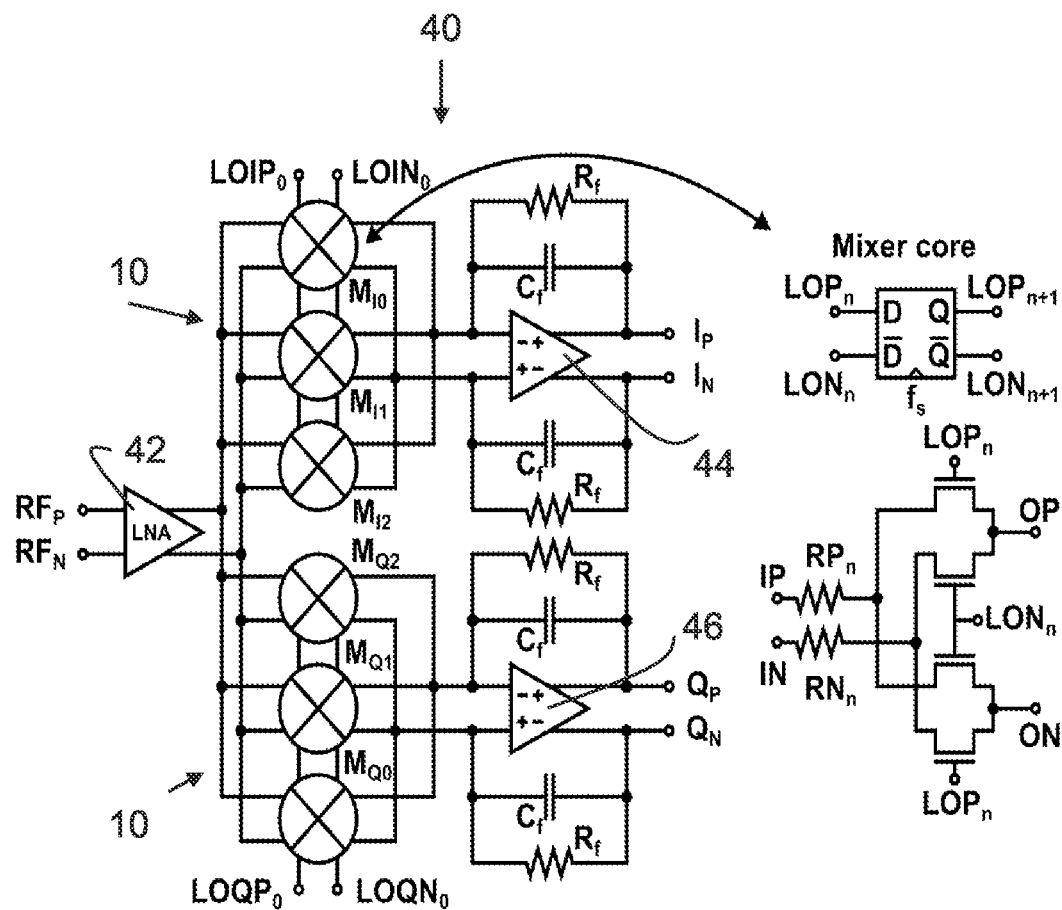
FIGS. 3a and 3b show an example implementation in a direct down-conversion receiver.

An example application when using an electrical circuit as described above can be in a direct down-conversion receiver. Such a receiver 40 is shown in FIG. 3a. In the exemplary embodiment shown in FIG. 3a an electrical circuit 10 according to the embodiment set out above in conjunction with FIG. 1 is used for the in-phase (I) and quadrature (Q) branches, respectively of the receiver 40.

The electrical circuits 10 can have three mixers each to obtain harmonic rejection for the 3rd and 5th harmonic of the LO signal. The relative weighting can then be set as above.

In FIG. 3b, the respective mixers of an electrical circuit 10 in FIG. 3a are depicted. In FIG. 3b, the respective Positive Local Oscillator signals (LOPn) and the respective negative Local oscillator signals (LONn) are implemented using resistors RPn and RNn, (n=0,1,2), whose currents are then summed at the virtual ground of the baseband transconductance amplifier.

Thus, a receiver 40, in particular a direct down-conversion receiver can be provided that comprises and makes beneficial use of the electrical circuit 10 outlined in FIG. 1. The direct down-conversion receiver 40 of FIG. 3a comprises an input low-noise amplifier (LNA) 42 to which the input signal to the receiver 40 is fed. The input signal is typically a radio frequency analogue signal in the case of a direct down-conversion receiver 40. An aspect to consider is then that the absolute value of the resistance loading the low-noise amplifier (LNA) at any time should be kept constant to avoid impedance level modulation. Further, the output from the electrical circuits 10 for the respective I and Q branches can be connected to amplifiers 44 and 46, respectively for forming the respective output signals for the I and Q branches, i.e. Ip, In and QP, Qn.

Figure 4:
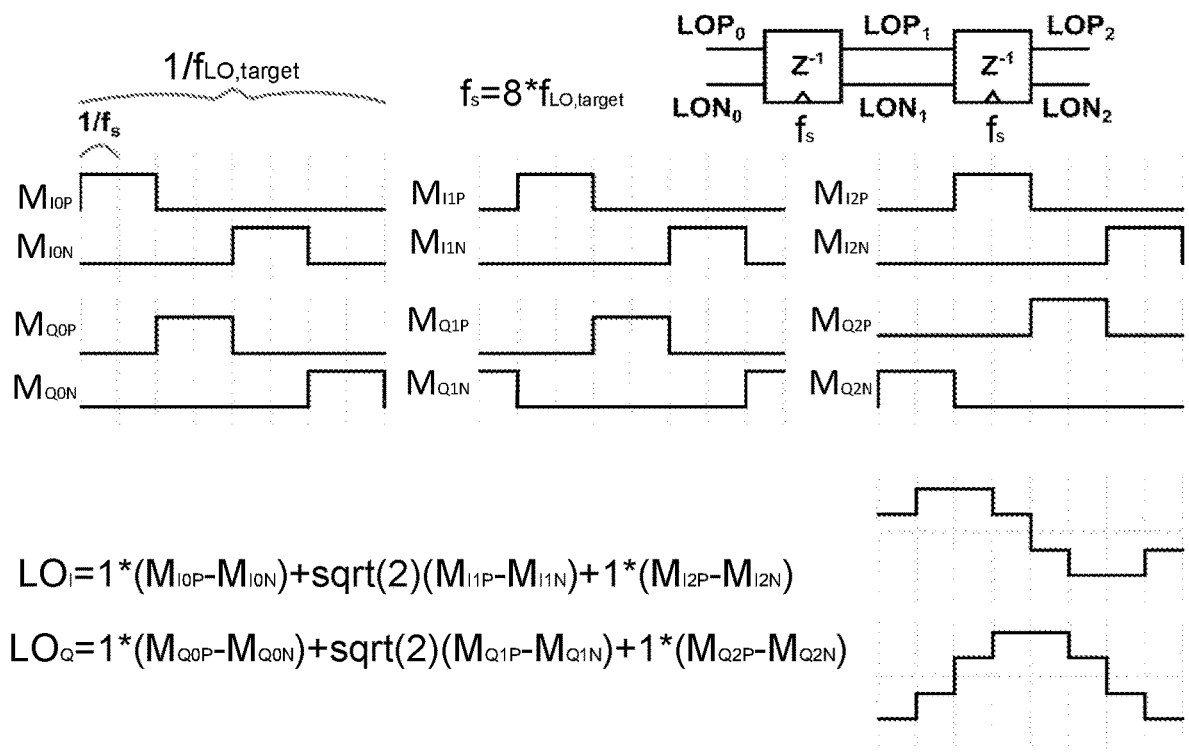
FIG. 4 shows different waveforms that can result in the exemplary implementation.
Figure 5:
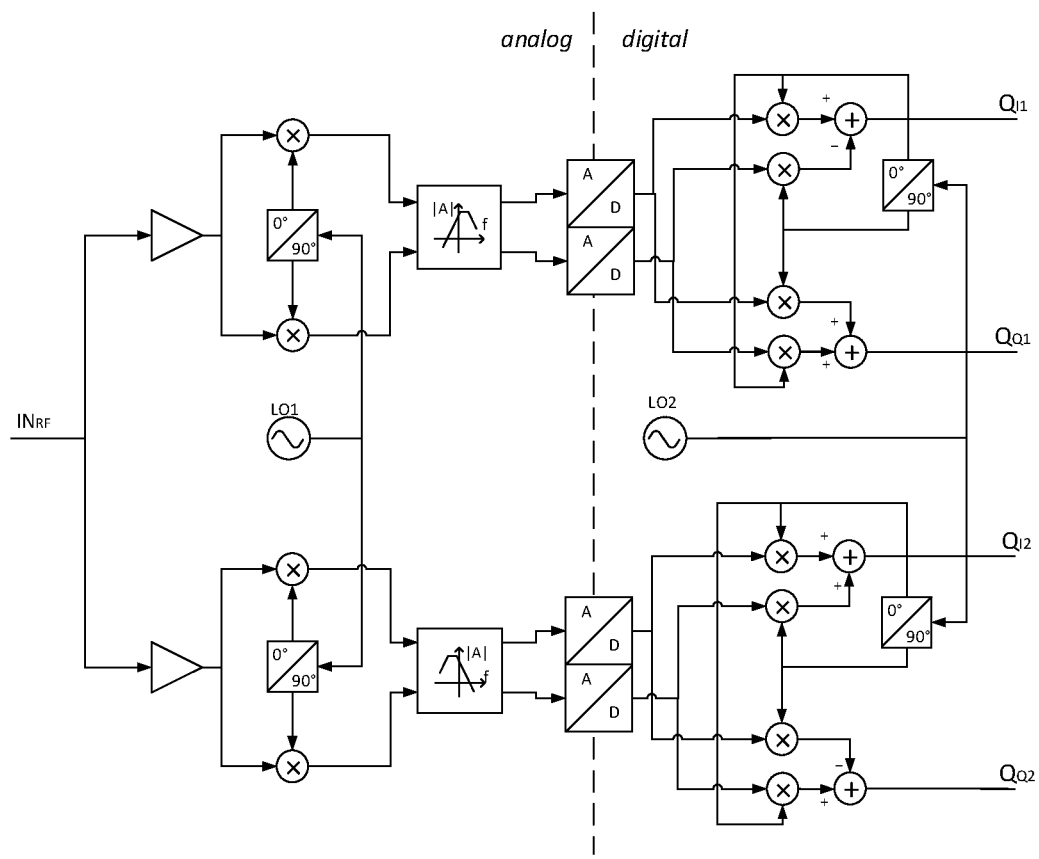
FIGS. 5 and 6 illustrate known receiver structures, FIG. 7 illustrate an RF receiver for receiving an RF signal with aggregated carriers.

In accordance with one embodiment, the sampling rate fs is 8 times the target LO frequency f_(LO,target). Such a scenario is shown in FIG. 4. In FIG. 4 the positive (MInP, MQnP) and negative (MInN, MQnN) LO waveforms for each mixer MIn, MQn (n=0,1,2) for the I branch and Q branch respectively are shown. Also, FIG. 4 shows the effective LO waveforms for I and Q branch LOI and LOQ after summing of the output signals from the mixers.

When constructing a receiver covering a higher IF frequency range with the same, single, receiver, the complex filter should be implemented with more wideband filtering techniques than the widely used operational amplifier based active-RC filters. Often transconductance-C filters are used in applications with relaxed linearity requirements. In order to overcome the linearity issue, a continuous-time complex IF-resonator is implemented by using relatively linear voltage and current buffers.

Alternatively, different discrete-time switched-capacitor techniques are used to realize IF-filters resulting in relatively large current consumption caused by high frequency switch drivers and spur tones caused by aliasing and harmonic mixing.

In order to reach optimum dynamic range and bandwidth compromise for the ADC, the down-conversion from IF is performed before the ADC in analogue domain. Since the complex IF-filter has rather limited selectivity, the IF down-converter should have good harmonic rejection capabilities. This can for example be implemented using a FIR-mixer as described above that is operating from the ADC clock.

A FIR-mixer with 3 weights can provide harmonic rejection up to the 5th harmonic of the IF-frequency that is $f_{CLK}/8$. With just a relatively small added complexity, a FIR-mixer with two taps more can be implemented that can reject IF harmonics up to the 9th harmonic of the IF-frequency of $f_{CLK}/8$. Further combination details with the example of a 2 GHz ADC clock frequency are given in Table 1 below. Therefore, with a FIR-mixer with 3, 4 or 5 adjustable weights and one optional clock divider it is possible to support a flexible set of IF-frequencies ranging from 83 MHz to 250 MHz with a 2 GHz ADC clock.

| CLK div | FIR mixing weights | IF frequency [MHz] | Highest rejected harmonic [MHz] | 1st mixed harmonic [MHz] |
|---|---|---|---|---|
| 1 | sin(45°), sin(90°), sin(135°) | 250.00 | 1250 | 1750.00 |
| 1 | sin(36°), sin(72°), sin(108°), sin(144°) | 200.00 | 1400 | 1800.00 |
| 1 | sin(30°), sin(60°), sin(90°), sin(120°), sin(150°) | 166.67 | 1500 | 1833.33 |
| 2 | sin(45°), sin(90°), sin(135°) | 125.00 | 625 | 875.00 |
| 2 | sin(36°), sin(72°), sin(108°), sin(144°) | 100.00 | 700 | 900.00 |
| 2 | sin(30°), sin(60°), sin(90°), sin(120°), sin(150°) | 83.33 | 750 | 916.67 |

Figure 7:
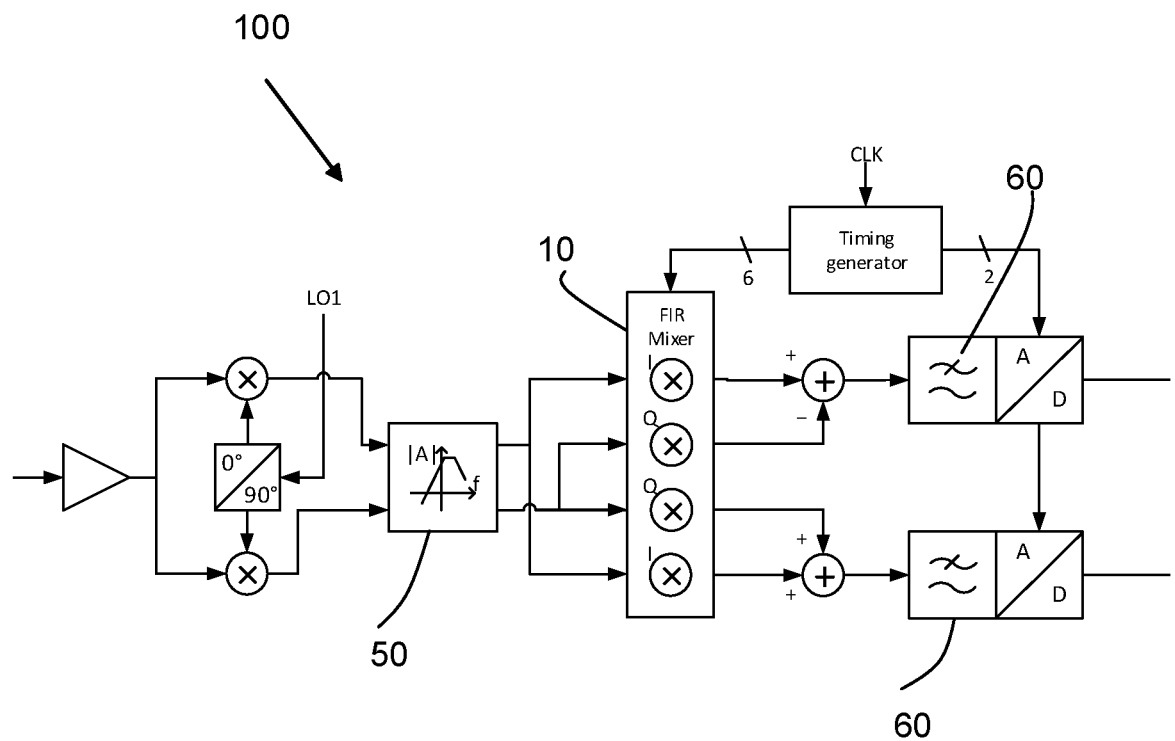

In FIG. 7, a single receiver 100 with variable IF frequency using a tunable complex filter and a FIR-mixer 10 operating with the Analogue to Digital Converter (ADC) clock is shown.

Since the FIR-mixer 10 can effectively reject IF-frequency harmonics, the channel filtering can be split between a low-order complex IF bandpass filter 50 and a high order baseband lowpass filter 60 thus further enhancing the area and power efficiency of an IC circuit. Even if the complex IF filter 50 improves the image and blocker rejection just by 6 dB it may result in significant power and area savings in the baseband filter and ADC. If the baseband noise floor is analogue noise limited, 6 dB lower noise would need four times lower impedance level for critical parts if resistor noise dominates or four times larger operation amplifier (OA) input stages if the flicker noise dominates. Hereby a receiver 100 configured to simultaneously receive at least two radio frequency bands with a single receiver path can be implemented The RF receiver 100 comprises a single local oscillator (LO) and the RF receiver is configured to filter a received signal using the complex filter 50 which can have a variable center frequency as is described below.

Figures 8A, 8B:
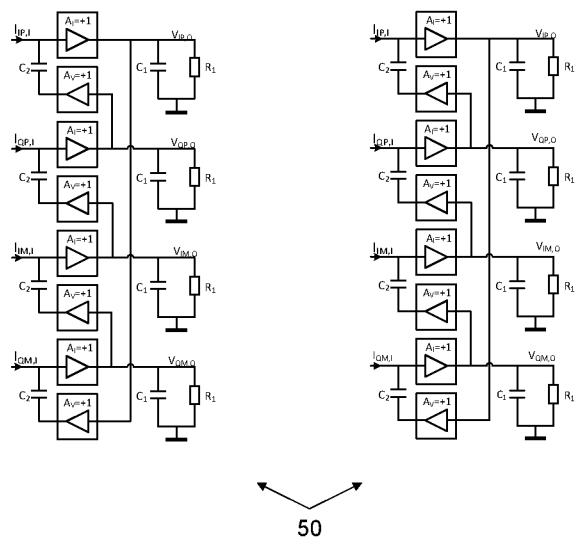
FIGS. 8a and 8b illustrate a filter with current and voltage buffers, FIG. 9 illustrate an implementation of current and voltage buffers, and FIG. 10 illustrate an aggregated carrier receiver.

The complex filter 50 can be implemented using current buffers AI and voltage buffers AV as depicted in FIGS. 8a and 8b. The current buffers implemented without the voltage buffers AV driving a capacitance of $C_2$ would behave as one pole lowpass filters with a time constant of $R_1C_1$. With voltage buffered capacitance $C_2$, also referred to as an offset capacitor $C_2$, the complex frequency center frequency can be varied by moving from zero either to positive frequencies by use of the circuitry depicted in FIG. 8a or to negative frequencies by use of the circuitry depicted in FIG. 8b.

The complex transimpedance of the filter stage is for both configurations of FIGS. 8a and 8b is:

$$Z_m(\omega) = \frac{R_1}{1 \pm \omega R_1 C_2 + j\omega R_1 C_1}$$

with a center frequency of $$\omega 0 = \mp \frac{C_2}{(C_2^2 + C_1^2)R_1}.$$

The peak transimpedance is also increased. Without the voltage buffered capacitors $C_2$, the Direct Current DC transimpedance would equal $R_1$ but with voltage buffered cross Connections becomes:

$$Z_m(\omega_0) = \frac{R_1}{C_1}\sqrt{C_2^2 + C_1^2}$$

When $C_2=2C_1$ the peak transimpedance becomes $R_1\sqrt{5}$ leading to approximately 7 dB more gain than without the voltage buffered capacitors. Similarly, this capacitor ratio results in over 10 dB of IF image rejection thus relaxing the image rejection requirements of the IF down-conversion mixer. In accordance with some implementations the center frequency is programmable to allow for easy change of the center frequency. For example, the offset capacitor can be programmable to offset the center frequency of the RC-circuit. The center frequency can in particular be set to a center frequency equal to an intermediate frequency (IF) of the RF receiver.

Figure 9:
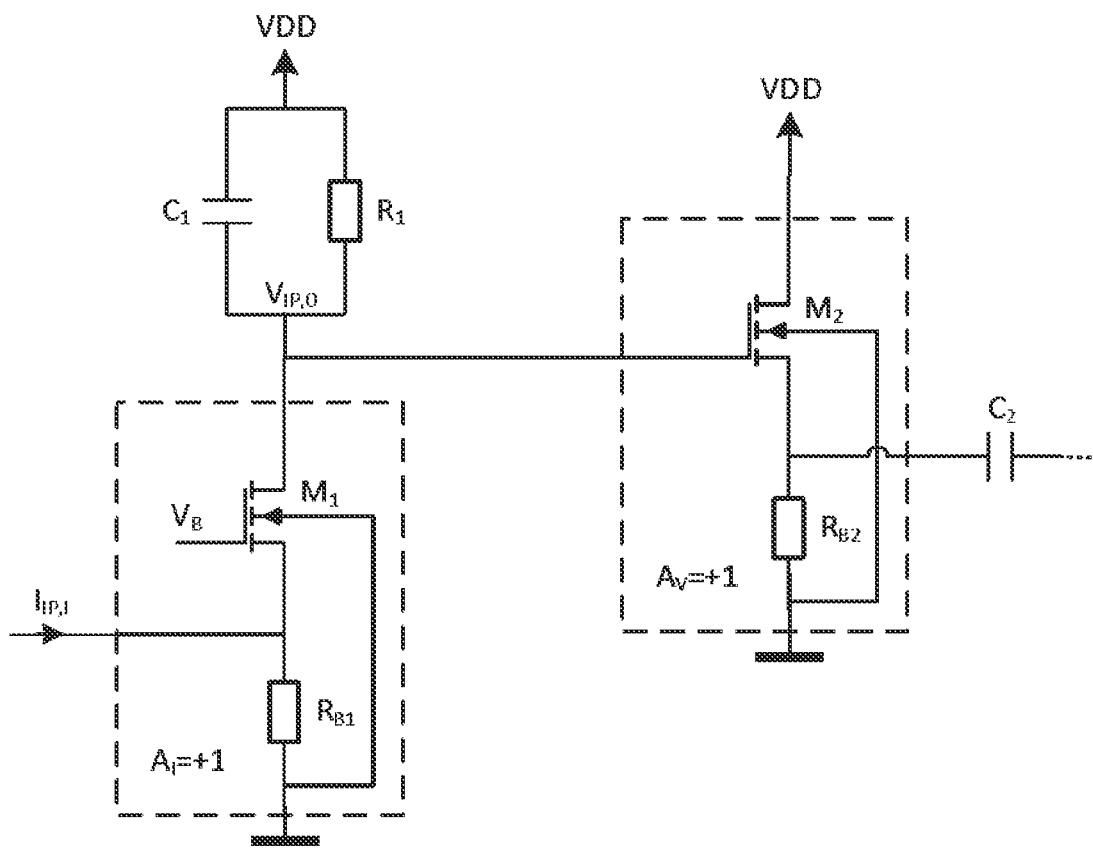

In FIG. 9 an exemplary implementation of the current buffers AI and voltage buffers AV are depicted. In the exemplary implementation of FIG. 9, the current buffer AI is implemented with one NMOS transistor $M_1$ with a bias resistor $RB_1$ providing the DC current path to ground, while a load resistor provides the bias current from the supply voltage VDD. The input bias resistor $RB_1$ helps to lower the input impedance further down from the NMOS transistor input impedance at source ($\sim 1/g_m(M_1)$). Similarly, in the implementation of the voltage buffer AV, the output impedance of the voltage follower depends both on the transconductance of the NMOS transistor $M_2$ and the bias resistor $R_{B2}$.

There are several well-known techniques to improve both the current and voltage buffer port impedances and linearity such as cascading techniques, super source-followers etc. Similarly, additional bias structures may be used to adjust input and output DC voltage levels in order to optimize voltage swings in each circuit node thus maximizing dynamic range. The single-ended amplifiers are also paired to pseudodifferential I- and Q-branch amplifiers possibly with additional common-mode voltage rejection structures.

By using current buffers and voltage buffers to implement the complex filter 50, it is possible to implement higher frequency filters with lower power consumption than with operational amplifiers. Still a good linearity performance is achieved because of the possibility to implement the current buffers and voltage buffer linearly with low complexity structures.

For added flexibility, the voltage buffers can in accordance with some implementations be disabled and shorted with a bypass switch resulting in lower filter center frequency and lower peak gain. The full complex filter both with current and voltage buffers has a center frequency of 250 MHz and a peak transimpedance gain of approximately 49 dBΩ, (~282Ω) while without voltage buffering the filter center frequency drops to 100 MHz and the peak gain below 47 dBΩ. So, an optional bypassing of the voltage buffers is useful in expanding the tuning range of the center frequency and the gain of the complex IF filter. Naturally, disabling the voltage buffers when possible also saves power.

Figure 6:
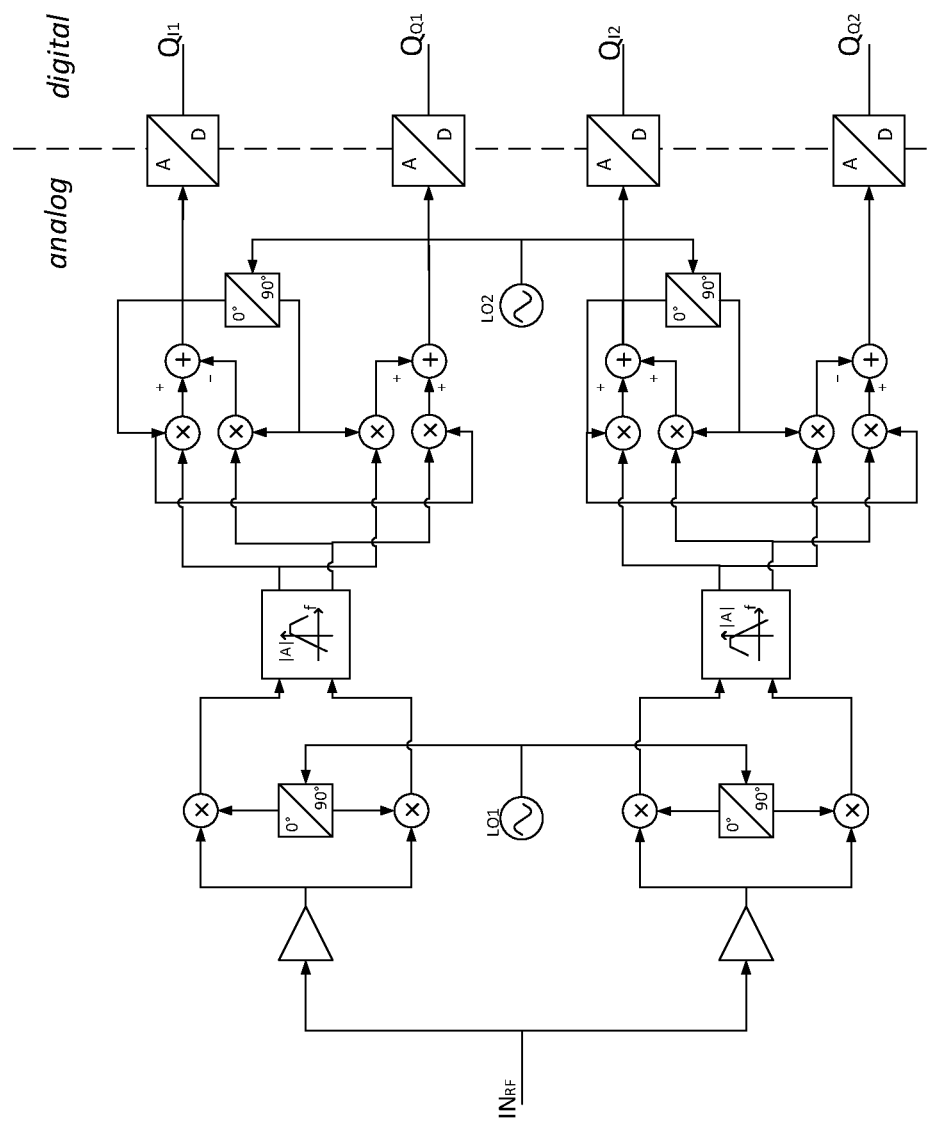
Figure 10:
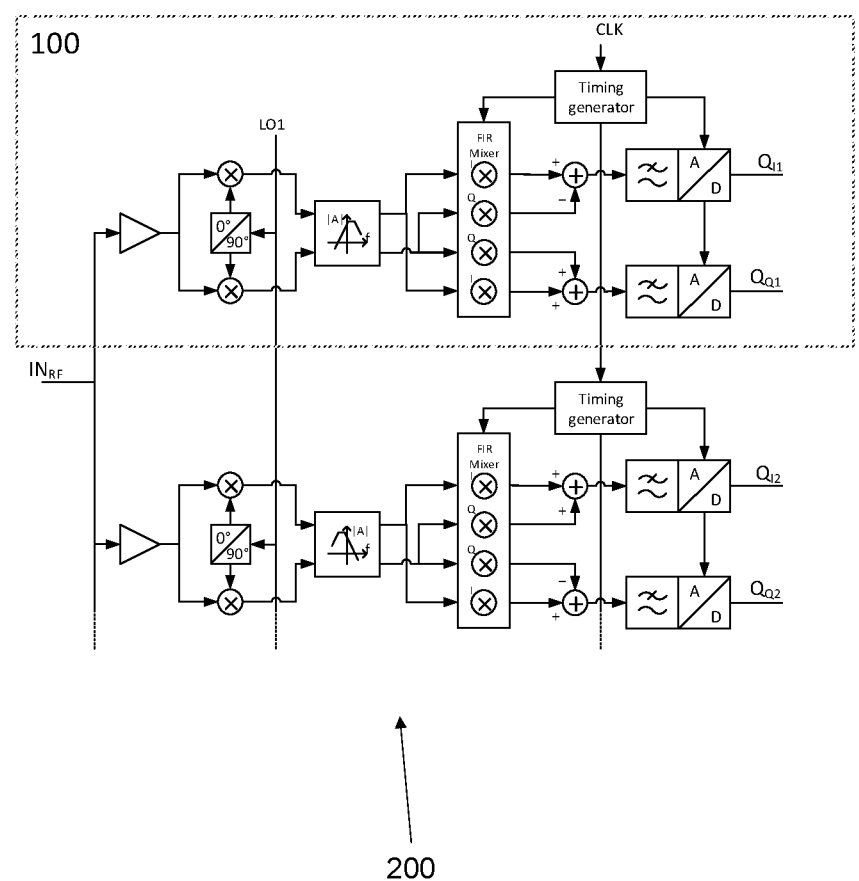

By using multiple (at least two) receivers 100 as described above a full carrier aggregation receiver can be implemented. FIG. 10 illustrate a carrier aggregation receiver 200 comprising two receivers 100, The multiple receivers 100 can then share the same RF LO synthesizer and the same ADC clock. Comparing with FIG. 6, the $LO_1$ and $LO_2$ of FIG. 6 is in the implementation of FIG. 10 implemented using a single LO ($LO_1$). The second LO ($LO_2$) (or any additional LO required) is/are then generated from the ADC clock by a Timing Generator.

When two (or more) such receivers are sharing the RF inputs and $LO_1$ frequency source, even more frequency combinations are possible. The receivers can independently filter different IF-frequencies either on positive or negative frequencies. It is also possible to implement three parallel receiver paths sharing the same RF input and $LO_1$ frequency source. wherein said at least two RF receivers are configured to operate with different signs of the intermediate frequency (IF). Also, such a carrier aggregation receiver can be configured to perform Analogue to Digital conversion (ADC) for each RF receivers using the same ADC clock. The FIR mixers for each RF receiver can also be configured to use the same ADC clock.

Such a carrier aggregation receiver architecture can provide a linear and simple complex IF filter based on current and voltage buffers capable of IF frequencies in the megahertz range and FIR-mixer that can support different IF frequencies with varying harmonic reject capabilities.

Further, the variable 3, 4, or 5-tap configuration for the FIR-mixer is advantageous for the receiver architecture because it can provide a useful set of IF downmixing frequencies supporting a wide range of carrier aggregation use cases as well as provides additional frequency planning options for spur avoidance.

What is claimed is:

1. A Radio Frequency (RF) receiver, comprising:
a pair of first mixers;
a first local oscillator (LO) coupled to the pair of first mixers;
a second mixer for intermediate frequency (IF) downconversion in the analog domain;
a complex filter having a variable center frequency coupled between the pair of first mixers and the second mixer, wherein the RF receiver is configured to:
simultaneously receive a carrier aggregation signal having at least two radio frequency bands with a single receiver path; and
filter, using the complex filter, a received signal output by the pair of first mixers based on the carrier aggregation signal, and
wherein the second mixer is a Finite Impulse Response (FIR) mixer implemented using parallel mixers, and the FIR mixer is configured to:
receive different weighted versions of an input signal from the complex filter; and
mix the different weighted versions of the input signal with different delayed versions of a LO signal generated by a second LO to form an output signal.

2. The RF receiver according to claim 1, wherein the variable center frequency of the complex filter is a programmable center frequency.

3. The RF receiver according to claim 1, wherein the variable center frequency of the complex filter is a center frequency equal to an intermediate frequency (IF) of the RF receiver.

4. The RF receiver according to claim 3, wherein the variable center frequency is either a positive or a negative IF of the RF receiver.

5. The RF receiver according to claim 1, wherein the complex filter comprises a grounded RC-circuit connected to a voltage buffer, and wherein the complex filter further comprises an offset capacitor configured to offset a center frequency of the grounded RC-circuit.

6. The RF receiver according to claim 1, wherein the FIR mixer comprises at least two delayed paths.

7. The RF receiver according to claim 6, wherein the FIR mixer comprises at least two and at most four delayed paths.

8. The RF receiver according to claim 6, wherein the FIR mixer is configured to weigh signals on paths of the FIR mixer.

9. A carrier aggregation receiver, comprising:
at least two Radio Frequency (RF) receivers, wherein each of the at least two RF receivers comprises:
a pair of first mixers,
a first local oscillator (LO) coupled to the pair of first mixers;
a second mixer for intermediate frequency (IF) downconversion in the analog domain; and
a complex filter having a variable center frequency coupled between the pair of first mixers and the second mixer, and the each of the at least two RF receivers is configured to:
simultaneously receive a carrier aggregation signal having at least two radio frequency bands with a single receiver path; and
filter, using the complex filter, a received signal output by the pair of first mixers based on the carrier aggregation signal, and
wherein the second mixer is a Finite Impulse Response (FIR) mixer implemented using Parallel mixers, and the FIR mixer is configured to:
receive different weighted versions of an input signal from the complex filter; and
mix the different weighted versions of the input signal with different delayed versions of a LO signal generated by a second LO to form an output signal.

10. The carrier aggregation receiver according to claim 9, wherein the at least two RF receivers are configured to operate with different signs of an intermediate frequency (IF) frequency.

11. The carrier aggregation receiver according to claim 9, wherein the at least two RF receivers are configured to operate with different IF frequencies.

12. The carrier aggregation receiver according to claim 9, wherein the each of the at least two RF receivers is configured to operate using the first LO.

13. The carrier aggregation receiver according to claim 9, the carrier aggregation receiver being further configured to:
perform Analogue to Digital conversion (ADC) for the each of the at least two RF receivers using a same ADC clock.

14. The carrier aggregation receiver according to claim 9, wherein FIR mixers for the at least two RF receivers are configured to use a same ADC clock.

15. The carrier aggregation receiver according to claim 9, wherein the variable center frequency of the complex filter is a programmable center frequency.

16. The carrier aggregation receiver according to claim 9, wherein the variable center frequency of the complex filter is a center frequency equal to an IF of the each of the at least two RF receivers.

17. The carrier aggregation receiver according to claim 9, wherein the variable center frequency is either a positive or a negative IF of the each of the at least two RF receivers.

18. The carrier aggregation receiver according to claim 9, wherein the complex filter comprises a grounded RC-circuit connected to a voltage buffer, and wherein the complex filter further comprises an offset capacitor configured to offset a center frequency of the grounded RC-circuit.

* * * * *